US012479078B2

(12) United States Patent
Craven

(10) Patent No.: US 12,479,078 B2
(45) Date of Patent: Nov. 25, 2025

(54) SET TOOL ASSEMBLY FOR DRIVING A FASTENER INTO A WORKPIECE

(71) Applicant: Crowflight Tools LLC, Boerne, TX (US)

(72) Inventor: Joseph Powell Craven, Boerne, TX (US)

(73) Assignee: Crowflight Tools LLC, Boerne, TX (US)

( * ) Notice: Subject to any disclaimer, the term of this patent is extended or adjusted under 35 U.S.C. 154(b) by 794 days.

(21) Appl. No.: 17/506,568

(22) Filed: Oct. 20, 2021

(65) Prior Publication Data

US 2022/0212328 A1 Jul. 7, 2022

Related U.S. Application Data

(60) Provisional application No. 63/133,746, filed on Jan. 4, 2021.

(51) Int. Cl.
*B25F 1/02* (2006.01)
*B25B 15/00* (2006.01)
*B25C 3/00* (2006.01)

(52) U.S. Cl.
CPC .............. *B25F 1/02* (2013.01); *B25B 15/004* (2013.01); *B25C 3/008* (2013.01)

(58) Field of Classification Search
CPC ..... B25B 15/004; B25B 23/12; B25B 23/005; B25F 1/02; B25C 3/008
USPC ............................................................ 81/44
See application file for complete search history.

(56) References Cited

U.S. PATENT DOCUMENTS

| | | | | | |
|---|---|---|---|---|---|
| 983,798 | A * | 2/1911 | Angell | B25C 3/008 | 74/544 |
| 4,299,021 | A | 11/1981 | Williams | | |
| 4,903,882 | A | 2/1990 | Long | | |
| 5,647,623 | A * | 7/1997 | Shiao | B25J 1/04 | 362/120 |
| 6,048,073 | A * | 4/2000 | Shiao | B25G 1/043 | 362/120 |
| 6,345,556 | B1 * | 2/2002 | Lin | B25G 1/105 | 81/177.1 |
| RE38,778 | E * | 8/2005 | Eggert | B25B 15/02 | 81/439 |
| 2008/0184494 | A1 * | 8/2008 | Govotski | B25C 5/11 | 7/164 |
| 2011/0303055 | A1 * | 12/2011 | Miller | B25G 3/12 | 81/489 |
| 2013/0019718 | A1 | 1/2013 | Vienneau et al. | | |
| 2013/0200129 | A1 | 8/2013 | Paddock | | |
| 2014/0260813 | A1 | 9/2014 | Hossack et al. | | |
| 2020/0130159 | A1 | 4/2020 | French | | |
| 2020/0246955 | A1 | 8/2020 | Zitlau et al. | | |

(Continued)

FOREIGN PATENT DOCUMENTS

WO WO2006094334 9/2006

*Primary Examiner* — Hadi Shakeri
(74) *Attorney, Agent, or Firm* — Brownstein Hyatt Farber Schreck, LLP

(57) ABSTRACT

A set tool may comprise a handle member and a fastener retention member modularly coupled with the handle member. A permanent magnet may be positioned within a portion of the handle member and may be used to secure a ferromagnetic fastener within a fastener retention recess formed within the fastener retention member, when the fastener retention member is engaged with the handle member.

11 Claims, 14 Drawing Sheets

(56) References Cited

U.S. PATENT DOCUMENTS

| | | | |
|---|---|---|---|
| 2020/0262044 | A1 | 8/2020 | Ferris et al. |
| 2022/0126434 | A1* | 4/2022 | Avalone .................... G09F 3/12 |

* cited by examiner

SET TOOL ASSEMBLY FOR DRIVING A FASTENER INTO A WORKPIECE

CROSS-REFERENCE TO RELATED APPLICATION

This application is a non-provisional of and claims the benefit under 35 U.S.C. 119(e) of U.S. Provisional Patent Application No. 63/133,746, filed Jan. 4, 2021, the contents of which are incorporated herein by reference as if fully disclosed herein.

TECHNICAL FIELD

The described embodiments generally relate to set tool assemblies. In particular, the described embodiments relate to magnetic and/or modular set tool assemblies for holding a fastener, aligning the fastener, and driving the fastener into a workpiece.

BACKGROUND

Fasteners are used for myriad purposes, such as to attach objects to one another or to hang objects on a wall. There are many varieties of fasteners, including screws, nails, staples, tacks, bolts, and nuts. Many types of fasteners, such as nails, tacks, and staples, are driven into a workpiece with an impact force, such as from a hammer. Such fasteners may first be 'set' to a proper position relative to a workpiece before being 'driven' into the workpiece.

In order to properly set and drive a fastener, a certain degree of skill and experience is necessary. Fasteners that are set and driven with, for example, an improper angle may be loosely secured, unsightly, or otherwise fail to perform their fastening function. Further, common methods of setting and/or driving a fastener may risk injury by exposing human body parts (e.g., a hand) to tools necessary to drive a fastener (e.g., a hammer may inadvertently strike a user's thumb). Additionally, projects with poorly set or driven fasteners may have reduced structural integrity or otherwise have a poor aesthetic appearance.

SUMMARY

This summary is provided to introduce a selection of concepts that are further described herein. This summary is not intended to identify key features or essential features of the claimed subject matter, nor is it intended to be used as an aid in determining the scope of the claimed subject matter.

According to some implementations of the disclosure, a tool for driving a fastener into a workpiece is provided. The tool may include a fastener retention member and a handle member. The fastener retention member may define a fastener retention recess at a first end of the fastener retention member, the fastener retention recess configured to receive at least a portion of the fastener positioned therein, and a coupling recess at a second end of the fastener retention member. The handle member may define a coupling protrusion at a coupling end of the handle member. The coupling protrusion may be configured to engage with the coupling recess of the fastener retention member to removably couple the handle member to the fastener retention member. The handle member may include a permanent magnet at least partially within the coupling protrusion and configured to magnetically retain the fastener within the fastener retention member.

In some embodiments, the fastener retention member may further define a cylindrical portion and a rectangular portion. The cylindrical portion may extend from the first end of the fastener retention member to a transition region. The rectangular portion may extend from the second end of the fastener retention member to the transition region. The coupling recess may be located at least partially in the cylindrical portion. The fastener retention recess may be located at least partially in the rectangular portion. The fastener retention recess may further define a first angled wall surface extending from an opening of the fastener retention recess and a second angled wall surface extending from the opening of the fastener retention recess. The first angled wall surface and the second angled wall surface may define a tapered portion of the fastener retention recess.

In some cases, a first tine of the fastener may contact the first angled wall surface and a second tine of the fastener may contact the second angled wall surface when the at least the portion of the fastener is positioned within the fastener retention recess. A blind end of the fastener retention recess may define a curved surface configured to receive a curved portion of the fastener thereon.

In some implementations, the coupling protrusion of the handle member may be a threaded protrusion, the coupling recess may be a threaded hole, and the threaded protrusion may engage with the threaded hole. The coupling protrusion may define a hollow portion within the coupling protrusion and the permanent magnet may be positioned within the hollow portion. The handle member may define a striking end opposite to the coupling end, the handle member may be configured to receive an impact force at the striking end, and the handle member may be configured to transfer the impact force to the fastener retention member to drive the fastener into the workpiece. The fastener retention recess may further define a first bowl portion having a first diameter and a second bowl portion having a second diameter, the second diameter different from the first diameter.

According to some implementations of the disclosure, a tool for driving a fastener into a workpiece may be provided. The tool may include an elongate body structure extending from a first end to a second end. The elongate body structure may define a fastener retention recess at the first end of the elongate body structure and configured to receive at least a portion of a fastener, a channel extending into the elongate body structure from a side surface of the elongate body structure, and a barrier wall between the channel and the fastener retention recess. The tool may further include a permanent magnet positioned in the channel and configured to magnetically retain the fastener in the fastener retention recess.

In some embodiments, the elongate body structure may further define a ramped surface in the channel configured to produce an interference fit between the elongate body structure and the permanent magnet. The elongate body structure may be configured to receive an impact force at the second end. The elongate body structure may be a unitary polymer structure.

According to some implementations of the disclosure, a tool for driving a fastener into a workpiece may be provided. The tool may include a guide structure defining a guide channel and a workpiece interface surface configured to contact the workpiece and align the guide structure relative to the workpiece during a fastener driving operation. The tool may further include a first magnetic component positioned proximate to the guide channel and a fastener holder. The fastener holder may include a shaft and a second magnetic component coupled to the shaft and configured to interact with the first magnetic component to releasably hold the fastener holder in a primed position in the guide channel. The shaft may define a first end configured to be positioned in the guide channel and to couple to the fastener and a second end configured to be positioned outside the guide channel. The fastener holder may be configured to be guided along a fastener-driving path by the guide channel and the fastener holder may be configured to be released from the primed position to drive the fastener into the workpiece in response to an impact force applied to the second end of the shaft.

In some embodiments, the second magnetic component may be further configured to releasably retain the fastener to the fastener holder. The workpiece interface surface may be angled at an oblique angle with respect to an axis extending through a center of the guide structure. The guide structure may define a flange extending from the guide channel and a bottom surface of the flange may define the workpiece interface surface.

In some implementations, the fastener may be positioned completely within the guide channel when the fastener holder is in the primed position, the fastener holder may be in a fully driven position when the first end of the shaft is in contact with the workpiece, and the fastener may at least partially protrude from the workpiece when the fastener holder is in the fully driven position. The first magnetic component and the second magnetic component may magnetically attract to retain the fastener holder in the primed position. The first magnetic component and the second magnetic component may magnetically repel to retain the fastener holder in the primed position.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

The use of the same or similar reference numerals in different figures indicates similar, related, or identical items.

Figure 1A:
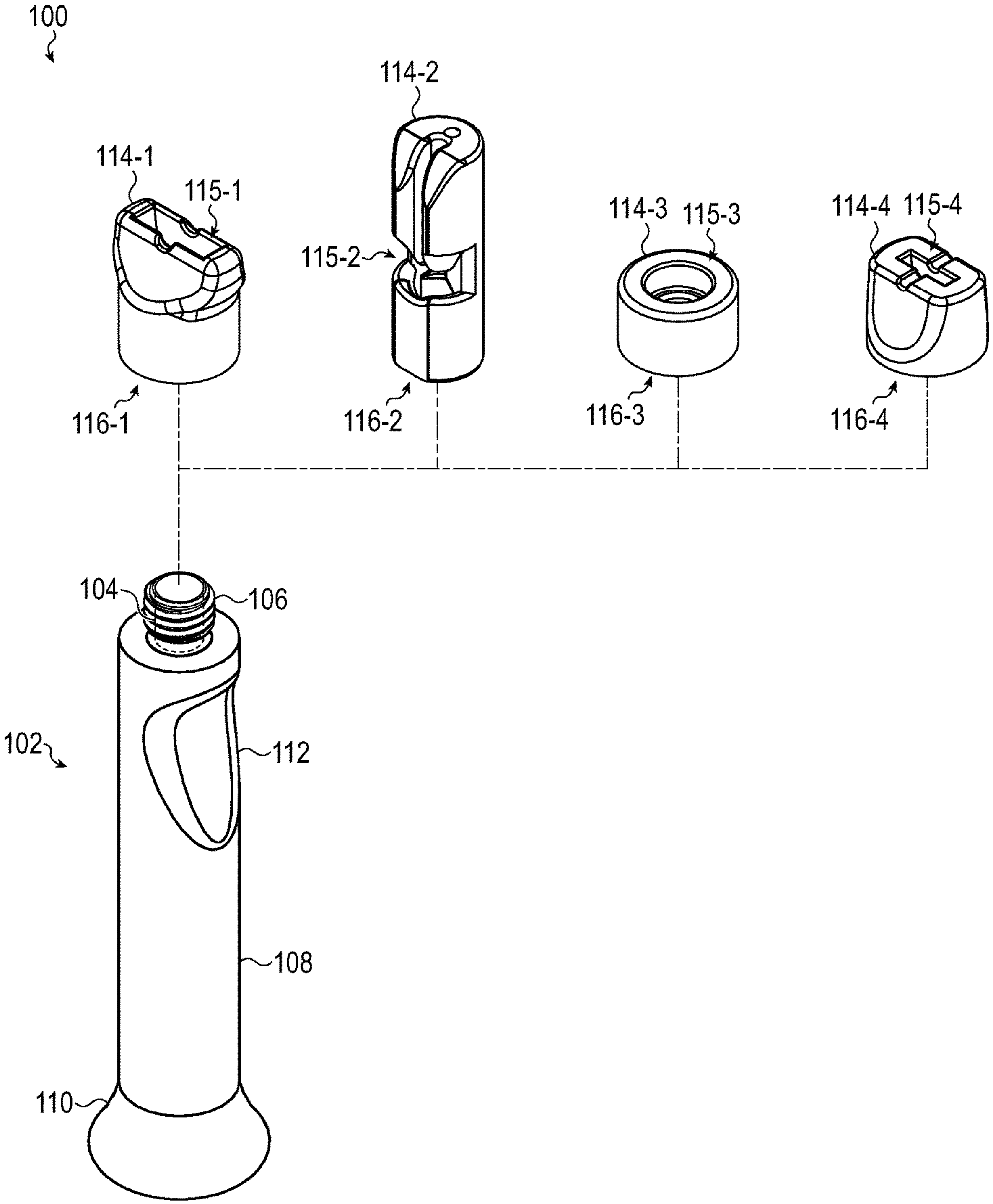
FIGS. 1A-1B illustrate an example handle member and example fastener retention members that may be coupled with the handle member, such as described herein.

Additionally, it should be understood that the proportions and dimensions (either relative or absolute) of the various features and elements (and collections and groupings thereof) and the boundaries, separations, and positional relationships presented, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Fasteners are generally used to mechanically join two or more objects together, either permanently or semi-permanently. For example, a nail may be used to mechanically join two boards together or may be used to hang an object such as a picture frame on a wall. Conventionally, a fastener is driven into a workpiece through the use of a particular tool, such as a hammer or a screwdriver. In order to properly drive a fastener into a workpiece, one must consider the proper angle at which to drive the fastener, the force required to drive the fastener, the potential safety concerns while driving the fastener, and so on. In some cases, a fastener may need to be driven at an awkward angle or in a difficult-to-reach position or location. Conventional tools may be awkward to use, especially for unskilled users, or may be unsuited for particular fastener types. Additionally, setting a fastener before driving may require manually holding the fastener against a workpiece, sometimes at an awkward angle or in a cramped location, which may be dangerous to the user, as a tool (e.g., a hammer) may strike a user's hand or other body part and cause injury.

As discussed herein, a number of tools usable to set and/or drive fasteners into a workpiece are described. Fastener setting and driving tools described herein (sometimes referred to simply as set tools) may be configured to magnetically retain the fastener in a target position in the set tool and be shaped or otherwise configured so that a fastener is properly aligned when the set tool is held against a workpiece. Further, the set tool allows the fastener to be so positioned without requiring a user to directly hold the fastener against the workpiece during the setting and driving operations. This may result in a safer operation where the risk of bodily injury is minimized and the likelihood of accurate setting and fastening is increased.

In various embodiments, a set tool may be modular, such that differently-shaped heads may be attached to a handle to accommodate differently-shaped fasteners. For example, a set tool may include a head, also referred to as a fastener retention member, that is removably couplable to a handle member. In some implementations, many different fastener retention members may be provided and may be used for different purposes, such as described herein. For example, a set tool system may include a head that is specifically configured for holding fencing staples (or other staples), a separate head that is specifically configured for holding penny nails, a separate head that is specifically configured for holding tacks, and so forth. Each head may be configured to couple to a common handle, thereby providing a modular system that can provide setting and driving support for numerous different types of fasteners.

An example head (or fastener retention member) may define a cavity (e.g., a fastener retention recess) for holding/receiving a fastener, and a coupling recess for coupling the head with the handle. The handle may include a protrusion or other feature that is received in the coupling recess of the head and may include a magnet. The positioning of the magnet in the protrusion of the handle may result in the magnet being positioned near the fastener retention recess of the head, so that a metal fastener positioned within the fastener retention recess is attracted to the permanent magnet and is held in place in the fastener retention recess. Positioning the magnet in the handle, rather than in the head, allows each head of the modular system to rely on a common magnet in the handle, rather than including a separate magnet in each head. Further, the magnet may be incorporated with the handle in a manner that results in impact forces (e.g., from a hammer) being diverted or routed around the magnet, thereby reducing the possibility of damage to the magnet.

To operate the set tool, a fastener, such as a staple or nail, may be placed within a fastener retention member and, more specifically, within a fastener retention recess. A combination of magnetic and mechanical forces may secure the fastener within the fastener retention recess. To place the fastener into a workpiece, a user may grasp the set tool and may position the set tool and fastener over a desired position on the workpiece. For example, a nail point may be placed against the work surface during a setting operation. The set tool, as described herein, may focus applied pressure (e.g., a user applied pressure or in response to a tool striking an end of the set tool) to the point(s) of the fastener. When sufficient pressure is applied, the fastener may be driven at least partially into the workpiece. When the set tool is withdrawn from the workpiece, the fastener may remain within the workpiece as the magnetic forces applied by the magnet within the handle are overcome by the mechanical forces of the fastener within the workpiece. Through the above arrangement, a fastener may be predicably applied as even glancing blows to a set tool may result in focused pressure to the points of the fastener.

The dimensions of the recess in a fastener head may be specifically configured to advantageously retain the fastener in a target position and/or orientation within the head. For example, the depth of the fastener retention recess may be established to both securely hold the fastener in place before and during the set operation and to ensure the fastener's position with respect to the workpiece for a subsequent driving operation. Thus, the depth of a recess configured to hold a nail may be deeper than a recess configured to hold a staple. In some operations, the setting of the fastener at the designed recess depth may be sufficient for either temporary or permanent fixture of the fastener in the workpiece. In other operations, the fastener retention member may be removed from the workpiece once the fastener initially enters the workpiece and is set, to allow the user to then drive the fastener further into the workpiece without the set tool. In still other operations, a driving tool may be used to assist with driving the fastener fully into its final driven depth.

The head may be removable from the handle, as described herein, or in some cases the handle and the head may be formed as a unitary structure. In some cases, the handle includes or defines a base portion that is configured to receive a force and transmit that force to the fastener retention member through the handle, thereby driving a fastener into a workpiece. The base portion may have a larger cross-sectional area than the main portion of the handle member to provide a large target for a hammer or other striking tool, while also allowing the handle to concentrate the force applied to the base portion onto the head. The head and handle may, in some cases, be formed from the same material such as a metal, plastic, polymer, any combination thereof, and so on. In some cases, the head and handle may be formed from different materials or combinations of materials.

Some embodiments may employ a guide structure to set an angle at which the fastener enters the workpiece. This guide may orient the tool relative to the workpiece at the desired angle. In some embodiments this angle (the "work angle") is set, but in some embodiments the work angle may be varied by adjusting the guide relative to the workpiece. The guide may include a sleeve that partially surrounds or embraces the tool and rests against the workpiece. The guide may include, for example, a face or flange that abuts the workpiece to define the angle at which the fastener will be set and driven into the workpiece. The tool may move back and forth inside the guide, thereby permitting the fastener to be driven into the workpiece. In some implementations, the flange may be adjustable by a user, such that a user can set an angle of the guide.

While the foregoing describes set tools for various types of fasteners that are driven into a workpiece, also described herein is a tool for aligning and engaging nuts (or other threaded fastener components) and washers to a threaded fastener such as a bolt or threaded rod. For example, a generally cylindrical tool may include a recess that is configured to receive a nut, and a surface that is configured to receive a washer or other component that is configured to be captured between the nut and another object. A magnet in the tool retains both the nut and the washer to the tool and in alignment with one another. Once loaded with the nut and (optionally) a washer, the tool can be aligned with a bolt and used to initially thread the nut onto the bolt. Notably, because the washer is already aligned with the nut and retained to the same structure as the nut, the user does not need to align, hold, or install the washer separately from the nut. Instead, a single threading operation with the loaded tool aligns and installs the washer as well as the nut.

As the terms are used herein, the fastener retention member may be referred to as a "set piece," "head," or "top portion." The "workpiece" may refer to an object into which the fastener penetrates as a result of operating the tool.

These and other embodiments are discussed below with reference to FIGS. 1A-8B. However, those skilled in the art will readily appreciate that the detailed description given herein with respect to these figures is for explanatory purposes only and should not be construed as limiting.

Figure 1B:
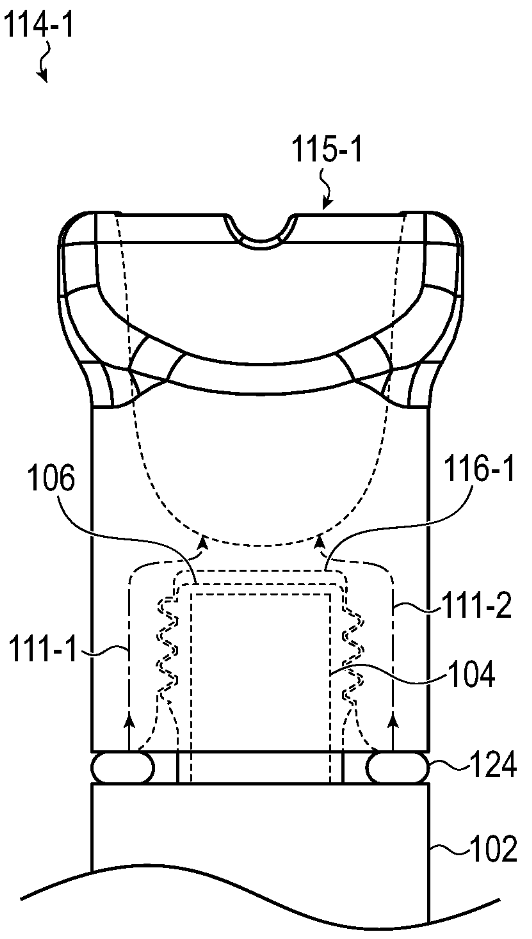

FIGS. 1A-1B illustrate an example tool 100 (e.g., a set tool) comprising a handle member 102 and multiple exemplary fastener retention members 114 (including example fastener retention members 114-1, 114-2, 114-3, and 114-4). As depicted in FIGS. 1A-1B, the handle member 102 may include a coupling protrusion 106 that engages with a respective coupling recess 116 (e.g., coupling recesses 116-1, 116-2, 116-3, and 116-4) of a fastener retention member 114 (e.g., fastener retention members 114-1, 114-2, 114-3, and 114-4) in a removeable fashion. That is, a particular fastener retention member 114-1, 114-2, 114-3, and 114-4 may be provided on the handle member 102 depending on user preference which may be based on a type of fastener that is desirably set and/or driven.

The tool 100 may be used by a user to easily and reliably set a fastener into a workpiece. In an example operation, a user may couple (e.g., screw) a fastener retention member on the handle member 102 and may position a fastener within a cavity (e.g., a fastener retention recess) of the fastener retention member. For example, the user may couple the fastener retention member 114-1 (e.g., a fastener retention member configured to hold a staple such as a fencing staple) to the handle 102 and may place a staple within the fastener retention recess 115-1. The user may then position the staple in a target position on a workpiece and set (e.g., partially drive) the staple in place by striking the tool with a hammer or other tool, or by otherwise pressing the tool with sufficient force to set the staple in place. In this way, a user may set the staple into the workpiece without initially striking the staple directly, which would risk personal injury to the user (e.g., by striking a hand of the user with a hammer). After the staple is set into the workpiece, the user may strike an end portion of the handle member to fully or partially drive the staple into the workpiece, and/or remove the tool from the staple and strike the now-set staple directly. Additional features of the tool 100 (or similar tools) are discussed herein and may include the use of a permanent magnet and/or magnetism to retain the fastener to the tool.

The handle member 102 may include a coupling protrusion 106, a permanent magnet 104, a shaft 108, a recessed grip 112, and a striking portion 110. The handle member 102 may be formed of any suitable material, such as a metal, polymer, or a combination of materials. For example, the recessed grip 112 may be at least partially formed from a rubber material glued or otherwise affixed on a portion of the shaft 108. In some cases, the recessed grip 112 is omitted.

As depicted, a number of fastener retention members 114-1, 114-2, 114-3, 114-4 may be respectively coupled with the handle member 102. Each of the fastener retention members 114-1, 114-2, 114-3, 114-4 may be configured for a particular purpose and/or type of fastener. It is noted that the fastener retention members 114-1, 114-2, 114-3, 114-4 illustrated in FIG. 1A are merely examples, and other types of fastener retention members may be provided in accordance with the disclosure.

A first fastener retention member 114-1 may be designed to set/drive staples such as fencing staples. As illustrated, a fastener retention recess 115-1 may be shaped to receive/hold a staple. An opening of the fastener retention recess 115-1 may be rectangularly-shaped, which may generally correspond to the aspect ratio of a staple (as viewed from the top). The first fastener retention member 114-1 may additionally include a coupling recess 116-1 to couple with a coupling protrusion 106 of the handle member 102. The coupling recess 116-1 and the coupling protrusion 106 may have complementary threads that allow the first fastener retention member 114-1 and the handle member 102 to be coupled together in a threading or screwing operation. The opening of the fastener retention recess 115-1 may be positioned at a first end of the first fastener retention member 114-1, opposite from a second end of the first fastener retention member 114-1 where the coupling recess 116-1 is positioned.

A second fastener retention member 114-2 may be designed to set/drive nails such as penny nails. As illustrated, a fastener retention recess 115-2 may be formed in the second fastener retention member 114-2 and may be shaped to receive/hold a nail. As evident from FIG. 1A, the second fastener retention member 114-2 may have an elongate shape with respect to the first fastener retention member 114-1 to account for the different lengths between a staple and a nail. The second fastener retention member 114-2 may also define a slot or channel that receives and supports a portion of a shaft of a nail or other fastener received in the second fastener retention member 114-2.

The second fastener retention member 114-2 may additionally include a coupling recess 116-2 to couple with a coupling protrusion 106 of the handle member 102. The opening of the fastener retention recess 115-2 may be positioned at a first end opposite from a second end where the coupling recess 116-2 is positioned.

A third fastener retention member 114-3 may be designed to set/drive convex objects such as a tack or decorative nail or other fastener having a convex head. As illustrated, a fastener retention recess 115-3 may be shaped to receive/hold a convex object. An opening of the fastener retention recess 115-3 may be circularly-shaped, which may generally correspond to a rounded head of a fastener, but may also accept fasteners with non-circular convex heads (e.g., pyramidal heads). The third fastener retention member 114-3 may additionally include a coupling recess 116-3 to couple with a coupling protrusion 106 of the handle member 102. The opening of the fastener retention recess 115-3 may be positioned at a first end opposite from a second end where the coupling recess 116-3 is positioned.

A fourth fastener retention member 114-4 may be designed to set/drive objects, such as staples. The fourth fastener retention member 114-4 may be configured to hold staples of a different size/shape as compared with the first fastener retention member 114-1. For example, the staples configured to be placed in the fastener retention recess 155-4 may have a square crown profile, though the staples are not limited as such. As illustrated, a fastener retention recess 115-4 may be shaped to receive/hold a staple or other similarly shaped object. An opening of the fastener retention recess 115-4 may be rectangularly-shaped, though other shapes of the opening may be used in alternative embodiments. The fourth fastener retention member 114-4 may additionally include a coupling recess 116-4 to couple with a coupling protrusion 106 of the handle member 102. The opening of the fastener retention recess 115-4 may be positioned at a first end opposite from a second end where the coupling recess 116-4 is positioned.

The fasteners, as described with respect to the fastener retention members 114-1, 114-2, 114-3, 114-4, may be at least partially formed of a ferromagnetic material. Therefore, a permanent magnet 104 positioned within the coupling protrusion 106 of the handle member 102 may attract a respective fastener when the fastener is positioned within a respective retention recess. The permanent magnet 104 may be any type of magnet (e.g., a rare-earth magnet, a ceramic magnet, or a neodymium iron boron magnet) and may be positioned inside of the coupling protrusion 106. The permanent magnet 104 may be incorporated into the handle member 102 in various ways. For example, the handle member 102 may be at least partially hollow, and the permanent magnet 104 may be placed within the hollow portion of the handle member (e.g., through a channel extending at least partially through the handle member 102). In some examples, the hollow portion of the handle member 102 may be a blind hole formed from the top of the coupling protrusion 106, into which the permanent magnet 104 is positioned. In other examples, the hollow portion of the handle member 102 may be a blind hole formed from the bottom of the handle member 102 (e.g., the striking portion), into which the permanent magnet 104 is positioned. Material (e.g., an adhesive) may then fill all or part of a remaining portion of the channel, thereby securing the permanent magnet 104 within the handle member 102. Alternatively, molding or injection processes may be used to surround the permanent magnet 104 with a material comprising the handle member 102 (e.g., plastic may be injected, an epoxy or other adhesive may be flowed in place, or the like). In some implementations, a ramped portion may be formed within an internal cavity of the handle member 102 and the permanent magnet 104 may be wedged against, or otherwise in an interference fit with, walls of the handle member 102 defining the internal cavity. Through this arrangement, adhesives may be avoided.

The handle member 102 may additionally define a recessed grip 112. The recessed grip 112 may be a recessed portion of the handle member 102 and may allow a user to comfortably grip the handle member 102 during loading, setting, and/or driving operations. In some implementations, the recessed grip 112 may include a gripping surface (such as a smooth or textured rubber, polymer, or other material or texture).

The handle member 102 may additionally include a striking portion 110 positioned at an end of the shaft 108 that is opposite from the coupling protrusion 106. The striking portion 110 may be flared, as depicted in FIG. 1A, and may, in some implementations, be reinforced. A user may strike the striking portion 110 with an additional tool, such as a hammer, to set or drive a fastener positioned within a fastener retention recess into a workpiece. As the handle member 102, rather than a user's hand, is used to set the respective fastener against a workpiece, the user's hand may be positioned in a safe area and risk of striking the user's hand against the additional tool may be avoided or minimized. Further, the striking portion 110 may be wider than the shaft 108, thereby presenting a larger striking area than the shaft 108 alone, and may also help protect the user's hand from poorly aimed hammer blows.

FIG. 1B illustrates a cross-sectional view of the first fastener retention member 114-1 when coupled with the handle member 102. While the first fastener retention member 114-1 is illustrated, any fastener retention member may be similarly coupled.

As discussed with respect to FIG. 1A, a coupling protrusion 106 may engage with the coupling recess 116-1. Both the coupling protrusion 106 and the coupling recess 116-1 may comprise threaded portions such that the coupling protrusion 106 may screw onto the coupling recess 116-1. That is, the coupling protrusion 106 may be a threaded protrusion and the first coupling recess 116-1 may be a threaded hole. The coupling protrusion 106/threaded protrusion may engage with the coupling recess 116-1/threaded hole as depicted in FIG. 1B.

As described with respect to FIG. 1A, a permanent magnet 104 may be positioned within the coupling protrusion 106. As the permanent magnet 104 is positioned within the handle member 102, each of the fastener retention members need not include a magnet, which may decrease complexity and cost associated with each of the fastener retention members, while also increasing durability. Further, as the fastener retention members are modular with respect to a single handle member 102, a total number of magnets required for the tool system may be reduced.

A flexible seal 124 may additionally be provided between the fastener retention member 114-1 (or any fastener retention member) and the handle member 102. The flexible seal 124 may be at least partially compressed when the fastener retention member 114-1 is coupled with the handle member 102 and may reduce stresses which may result from the engagement of the coupling protrusion 106 and the coupling recess 116-1. The flexible seal 124 may additionally provide some degree of adjustability of the fastener retention member 114-1 with respect to the handle member 102, as the flexible seal 124 may allow the fastener retention member 114-1 to be threaded to different rotational positions while providing sufficient friction that the fastener retention member stays in place and does not tend to unthread itself from the handle member 102. The flexible seal 124 may be formed from any number of materials, such as a rubber or plastic, and may be an o-ring. In some implementations, the flexible seal 124 may be omitted such that the handle member 102 is in direct contact (e.g., at respective top surfaces) with the fastener retention members. In additional implementations, a flexible seal 124 may be provided such that respective top surfaces, or portions thereof, of the handle member 102 and the fastener retention members are in direct contact. For example, a notch may be formed in any of the flexible seal 124 or the respective top surfaces of the handle member 102 and the fastener retention members to ensure that some degree of direct contact between the handle member 102 and the fastener retention member is present.

It is additionally noted that the coupling protrusion 106 and the coupling recess 116-1 may be configured so that an air gap is formed between the end of the coupling protrusion 106 and the top wall of the coupling recess 116-1 (e.g., the bottom of the blind hole that is the coupling recess 116-1). This gap may at least partially isolate the permanent magnet 104 from striking forces applied to the striking portion 110. For example, forces 111-1 and 111-2 resulting from a striking or pressing force applied to the handle member 102 may travel along the shaft 108 of the handle member 102, but may be directed or diverted around the permanent magnet 104 due to the gap. Stated another way, the gap may result in the permanent magnet 104 being substantially isolated from impact or compression forces during setting and driving operations, thereby helping prevent or reduce the likelihood of breaking or otherwise damaging the permanent magnet 104. In some cases, the coupling protrusion 106 and the coupling recess 116-1 are configured so that an end face of the handle member 102 and an end face of the first fastener retention member 114-1 are in intimate contact with one another, such that impact or pressing forces are substantially or entirely transferred from the handle member 102 to the first fastener retention member 114-1 through the end faces, rather than through the threaded interface, thereby helping reduce the likelihood of damage to the threads and ensuring a direct and consistent force path to the first fastener retention member 114-1.

Figure 2A:
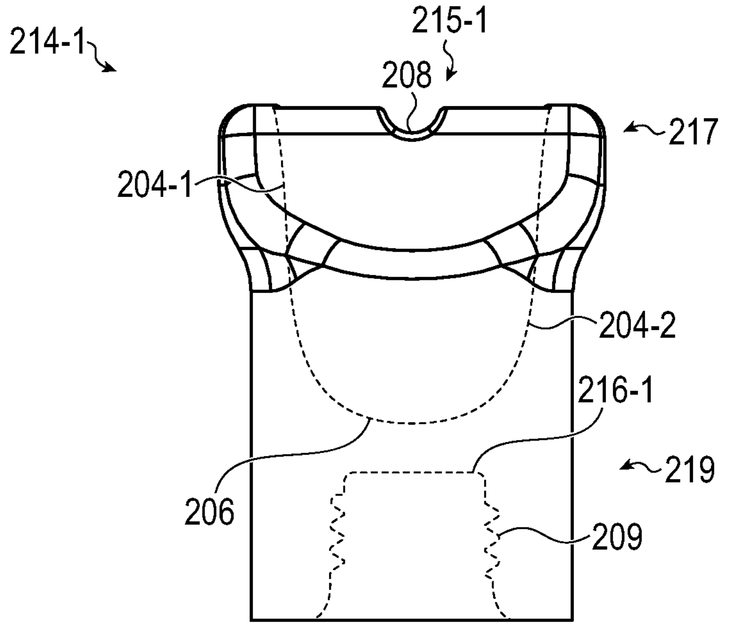
FIGS. 2A-2B illustrate an example fastener retention member configured to receive a fastener, such as a fencing staple, within a fastener retention recess thereof, such as described herein.
Figure 2B:
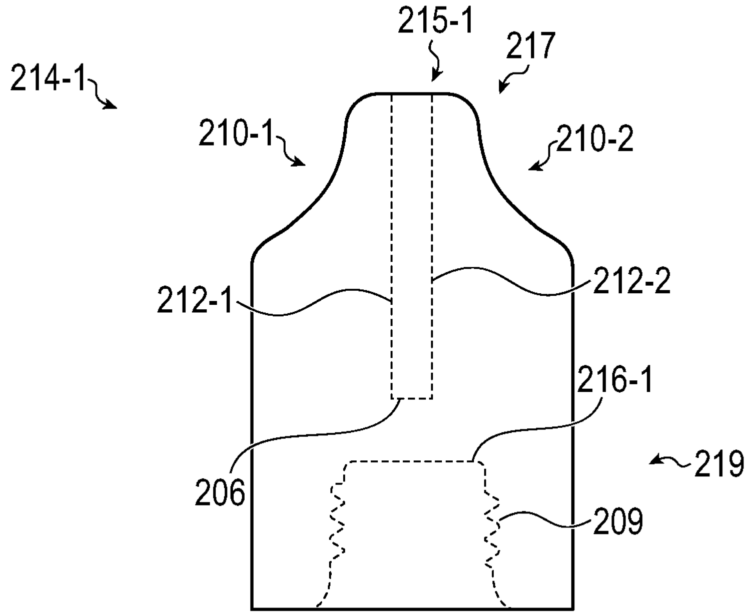

FIGS. 2A-2B illustrate a side view of an example fastener retention member 214-1 configured to receive a fastener, such as a fencing staple. The fastener retention member 214-1 may correspond to the first fastener retention member 114-1 discussed with respect to FIGS. 1A-1B.

The fastener retention member 214-1 may define a fastener retention recess 215-1 configured to receive a fastener (e.g., a staple) therein. The fastener retention recess 215-1 may be defined by a first angled wall surface 204-1, a second angled wall surface 204-2, and a tapered portion 206 (e.g., a bottom wall surface). The tapered portion 206 may be referenced as a blind end and may define a curved surface. The first and second angled wall surfaces 204-1/204-2 may extend from an opening of the fastener retention recess 215-1 (e.g., an opening through which a fastener may be received).

For example, a fencing staple may be positioned within the fastener retention recess 215-1 and may be received through an opening at the end of the fastener retention member 214-1. As the fencing staple enters the fastener retention recess 215-1 through the opening, side surfaces of the fencing staple (e.g., the legs or tines of the fencing staple) may contact a respective angled wall surface 204-1/204-2. As a distance between the angled wall surfaces 204-1/204-2 gradually decreases, respective legs of the fencing staple may contact a portion of the angled wall surfaces 204-1/204-2 and be guided towards the curved bottom surface of the fastener retention recess 215-1. Once positioned in the fastener retention recess 215-1, the angled wall surfaces may support the angled legs of the staple, while the curved bottom surface of the fastener retention recess 215-1 supports the curved crown of the fencing staple. Further, magnetic attraction from the permanent magnet 104 of the handle member 102 may retain the staple in the fastener retention recess 215-1 and against the curved bottom surface. In this way, movement of the staple within the fastener retention recess 215-1 may be prevented or inhibited during alignment, setting, and driving operations.

The configuration of the fastener retention recess 215-1, and in particular the angled wall surfaces 204-1/204-2 and the curved shape of the tapered portion 206, allow the fastener retention member 214-1 to accommodate differently sized staples with a single fastener retention member. For example, the angled wall surfaces 204-1/204-2 and the curved shape of the tapered portion 206 may result in a greater amount of contact between staples of multiple sizes than may be achieved with other shapes (e.g., straight wall and/or bottom surfaces). Further, the overall tapered configuration may result in optimal alignment of staples in the fastener retention recess 215-1, even if the staples are slightly smaller than the fastener retention recess 215-1, as the peak of the crown of the staple is guided towards the center of the curved bottom surface of the fastener retention recess 215-1 regardless of the size. In a differently shaped recess, such as a rectangular recess, a staple that is smaller than the intended staple size may result in the staple becoming angled or otherwise misaligned relative to the tool, which could result in the staple being poorly set or fastened, bent, broken, and so on.

As illustrated in FIGS. 2A-2B, the fastener retention member 214-1 may include a cylindrical portion 219 and a rectangular portion 217. The cylindrical portion 219 may be shaped as a cylinder and may form the bottom portion/base of the fastener retention member 214-1. The fastener retention member 214-1 may taper, along at least some dimensions, to the rectangular portion 217 at the a top portion of the fastener retention member 214-1. A transition region comprising curved walls 210-1/210-2 may be between the cylindrical portion 219 and the rectangular portion 217. The tapering from the cylindrical portion 219 to the rectangular portion 217 along the transition region may allow a user greater visibility of the area where the fastener is contacting the workpiece (e.g., so that a user can see the fastener, or a portion of the fastener, when the fastener is positioned in the fastener retention recess 215-1 and on a workpiece prior to setting or driving). By contrast, if the cylindrical portion 219 extended all the way to the top of the fastener retention member 214-1, the outer periphery of the cylindrical portion 219 may occlude or block the view of the fastener, making it more difficult to properly align or position the fastener on the workpiece.

As further depicted in FIGS. 2A-2B, a coupling recess 216-1 may include a threaded hole 209 comprising a plurality of threads. The threaded hole 209 may be configured to engage with a corresponding thread of a threaded protrusion of a handle member, as discussed with respect to FIGS. 1A-1B.

The fastener retention member 214-1 may additionally include grooves 208 on a top portion thereof (e.g., on a rectangular portion 217). The grooves 208, which may be semi-circular, may be used as a support for driving a staple after the staple is set. The grooves 208 may be used to help align the tool and the staple with another object, such as a wire (e.g., electrical wire or fencing wire). For example, if a user wants to fasten wire to an object, the grooves 208 may be used to center the tool and staple with respect to the wire. In some implementations, the fasteners retained by the fastener retention member 214-1 may have a gauge around about 8, though any gauge of fastener may be used in accordance with the provided disclosure. FIG. 2B additionally illustrates side walls 212-1 and 212-2, which define a side profile of the fastener retention recess 215-1.

Figure 3:
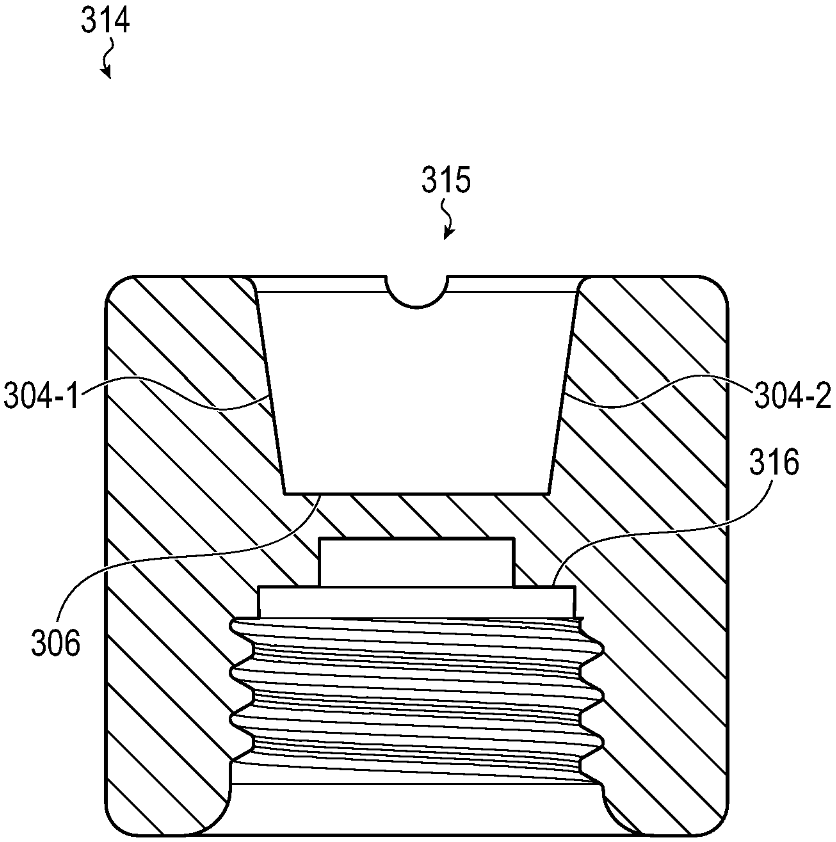
FIG. 3 illustrates an example fastener retention member configured to receive a fastener, such as described herein.

FIG. 3 illustrates another example of a fastener retention member 314. The fastener retention member 314 may be used to retain fasteners such as staples. In some implementations, the fasteners retained by the fastener retention member 314 may have a gauge around or larger than about 14, though any gauge of fastener may be used in accordance with the provided disclosure.

The fastener retention member 314 may define a fastener retention recess 315. The fastener retention recess 315 may, in turn, be defined by a first angled wall surface 304-1 and a second angled wall surface 304-2. In the embodiment depicted in FIG. 3, the two angled wall surfaces 304-1/304-2 may meet a bottom surface 306 which may have a flat profile. The fastener retention member 314 may be configured to receive fasteners having a flat striking surface, such as staples with a flat crown. In some implementations, the fastener retention member 314 may additionally receive fasteners having a rounded, or partially rounded, crown or striking surface.

The fastener retention member 314 may additionally define a coupling recess 316, including a threaded portion, to couple with a corresponding threaded protrusion of a handle member. As discussed herein, the threaded protrusion of the handle member may include a permanent magnet which may attract/secure a ferromagnetic fastener when the ferromagnetic fastener is positioned within the fastener retention recess 315. Further, the coupling recess 316 and the handle member may be configured so that impact forces are not imparted to the magnet, as described above with respect to FIG. 1B.

Figure 4B:
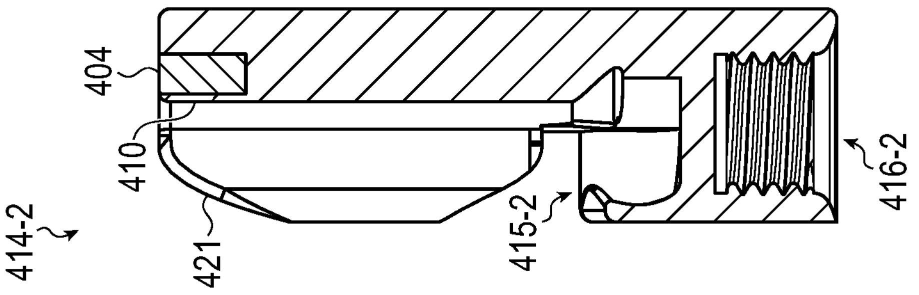
FIGS. 4A-4B illustrate an example fastener retention member configured to receive a fastener, such as a nail, within a fastener retention recess thereof, such as described herein.
Figure 4A:
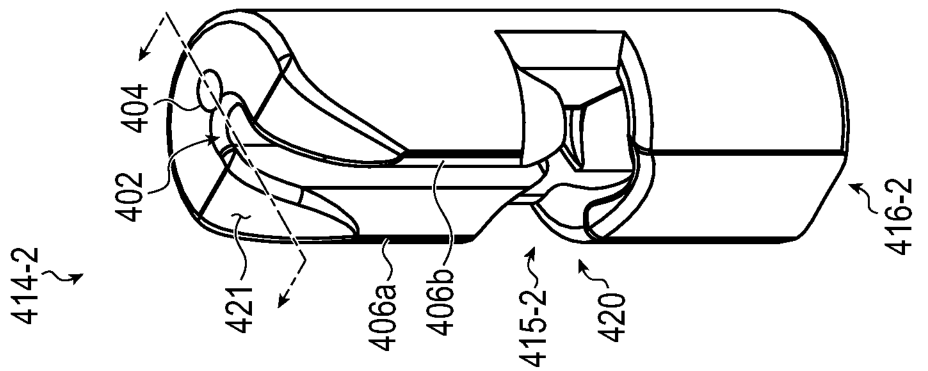

FIGS. 4A-4B illustrate another example fastener retention member 414-2. The fastener retention member 414-2 may be an embodiment of the second fastener retention member 114-2 discussed with respect to FIG. 1A.

The fastener retention member 414-2 may define a fastener retention recess 415-2 and a coupling recess 416-2. The fastener retention recess 415-2 may be configured to receive a nail, such as a penny nail. A head of a fastener, such as a head of a nail, may be received in the fastener retention recess 415-2, and a shaft of the fastener may be received in a channel that is defined at least in part by side walls ***406a*/*406b*. As described herein with respect to other fastener retention members, the fastener retention member 414-2 may define a fastener retention recess 415-2 that engages a protrusion of a handle member, and results in a magnetic force from the magnet in the handle member retaining the fastener in the fastener retention recess 415-2**.

In some cases, an additional permanent magnet 404 may be included in the fastener retention member 414-2 to help retain a fastener in a stable position in the fastener retention member 414-2. For example, the permanent magnet in the handle member (e.g., the permanent magnet 104, FIGS. 1A-1B) produces a retention force that is generally parallel with the shaft of the fastener (thereby pulling the fastener against the bottom surface of the fastener retention recess 415-2), and the additional magnet 404 produces a retention force that is generally perpendicular to the shaft of the fastener (thereby pulling the shaft of the fastener into the channel between the side walls 406*a*/406*b*). The combination of multiple magnets may help ensure that the fastener is axially aligned with the tool, such that that a kinetic force on the tool sets or properly drives the fastener and minimizes the risk of the fastener becoming dislodged during setting or driving. In some cases, side walls 406*a*/406*b* may provide an interference fit to secure the fastener within the fastener retention recess 415-2. The side walls 406*a*/406*b* may comprise protrusions, or nubs, to secure the fastener within the channel.

As depicted in FIG. 4B, a channel may be defined by the side walls 406*a*/406*b*. The channel may extend from the opening 402 to, or past, a slot 420 (configured to provide clearance for nail heads, for example) and a shaft of a fastener may be positioned within the channel. The channel may additionally be defined by a surface 410 defining a back of the channel.

The fastener retention member 414-2 may have a chamfer 421 that angles from an outer side of the fastener retention member 414-2 towards the opening 402. The chamfer 421 (defined by an angled and/or curved surface) allow greater visibility of the fastener when positioning the fastener on a workpiece, and may also allow the set tool to be maneuvered around the fastener after the fastener is driven into the workpiece, so as to facilitate removal of the tool with respect to the fastener. For example, even if the fastener is driven so that the end face of the fastener retention member 414-2 is flush with the workpiece, the chamfer 421 allows the user to remove the tool from the fastener by turning or otherwise angling the fastener retention member 414-2 away from the chamfer 421 (e.g., such that the fastener exits the slot, and the chamfer 421 provides clearance between the fastener retention member 414-2 and the workpiece).

Figure 5:
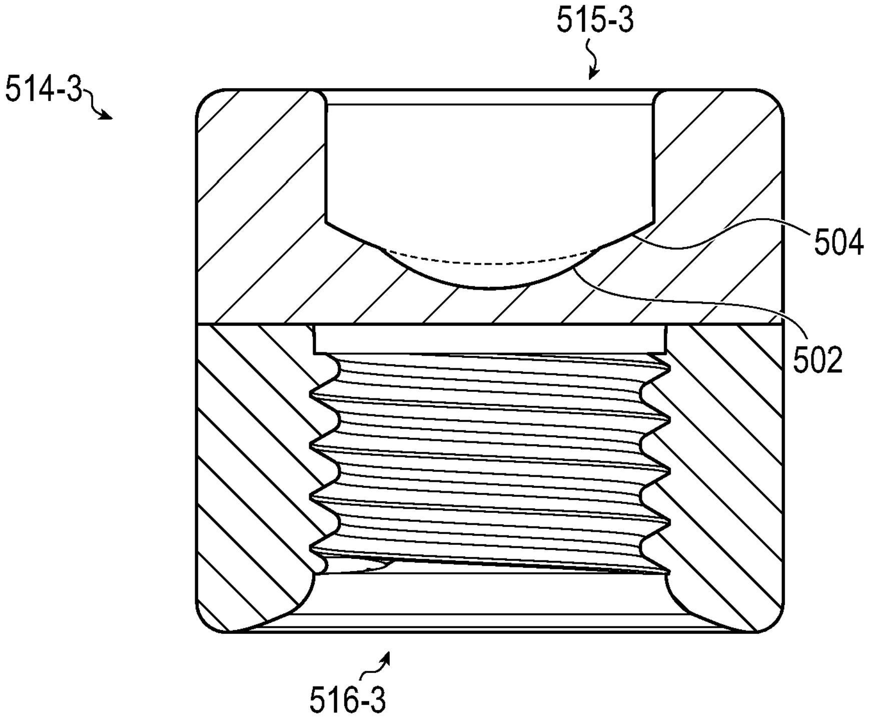
FIG. 5 illustrates an example fastener retention member configured to receive a fastener with a convex head, such as described herein.

FIG. 5 illustrates an example fastener retention member 514-3. The fastener retention member 514-3 may be an embodiment of the third fastener retention member 114-3 as discussed with respect to FIG. 1A.

The fastener retention member 514-3 may include a fastener retention recess 515-3 configured to receive a fastener with a convex head, such as a decorative nail or clavo nail, a tack, and so on. To properly support the shape of a convex head, and to accommodate fasteners with differently shaped and sized convex heads, the fastener retention recess 515-3 may define multiple regions with distinct curvatures. For example, a first region 502 may define a central concave region, with the concavity having a first radius of curvature (or other curved profile), and a second region 504 may define a peripheral concave region that surrounds the central concave region, with the concavity having a second radius of curvature that is different from the first radius of curvature (e.g., the second radius of curvature may be greater than the first radius of curvature, and may therefore define a shallower concavity).

It is appreciated that convex heads of fasteners may have a number of non-uniform sizes. Accordingly, the first region 502 may be configured to receive and secure convex fasteners having one size and/or shape, while the second region 504 may be configured to receive and secure convex fasteners having another size and/or shape. For example, a fastener with a convex head having a small radius of curvature (e.g., a steep or "tall" convex head) may contact the first, central concave region 502, while a fastener with a convex head having a larger radius of curvature (e.g., a shallower or "short" head) may contact the second, peripheral concave region 504. The multiple different curvatures of the fastener retention recess 515-3 allow the fastener retention member 514-3 to accept and support various convex head sizes and shapes. More particularly, it may be advantageous to support a convex fastener head with a circular support interface, which can result in the fastener head self-centering in the fastener retention recess, and can result in an even and axially-aligned transfer of force from the fastener retention recess 513-3 to the fastener. If a convex head has a smaller radius of curvature than the concave recess, the surface of the recess may only contact the fastener head at one point (e.g., the peak of the convex head, rather than a circular contact interface). By providing multiple curvatures, a wider range of shapes and sizes of convex fastener heads may be advantageously supported with a circular support interface in the fastener retention recess 515-3.

Further, as discussed above with respect to FIG. 1A, a permanent magnet positioned in a handle member (e.g., a coupling protrusion of a handle member) may be used to secure a fastener (e.g., a convex fastener) within the fastener retention recess 515-3. For example, a convex fastener secured within the fastener retention recess 515-3 may be formed at least partially from a ferromagnetic material and may be attracted toward the permanent magnet, thereby securing the convex fastener.

In an operation, a convex fastener secured within the fastener retention recess 515-3 may be set and/or partially driven into a workpiece, such as discussed herein. The fastener retention member 514-3 may additionally comprise a coupling recess 516-3 which may receive a corresponding coupling protrusion of a handle member, such as discussed herein.

Figure 6B:
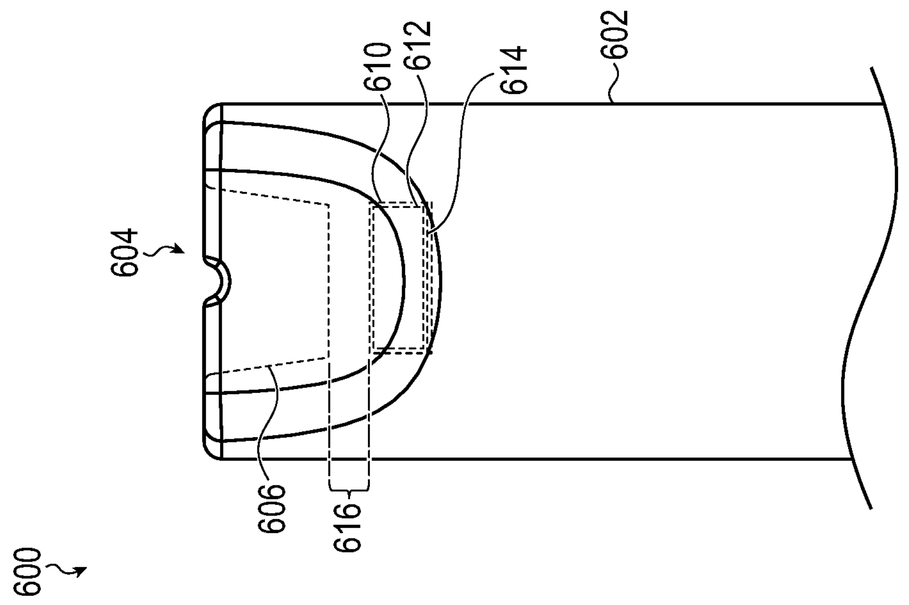
FIGS. 6A-6B illustrate an example tool configured to receive a fastener, such as described herein.
Figure 6A:
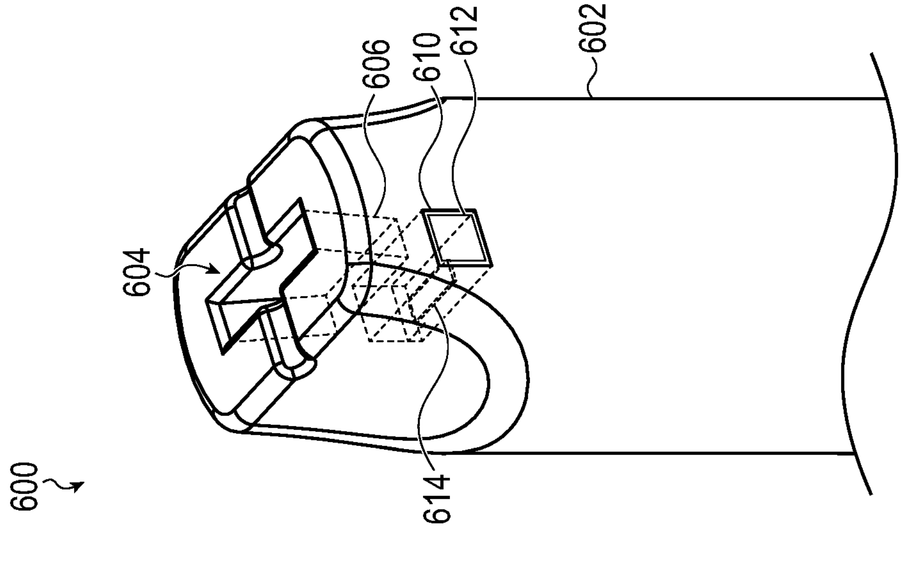

FIGS. 6A-6B illustrate an exemplary set tool 600 in which the handle and the head are formed as a unitary structure. For example, set tools discussed with respect to FIGS. 1A-5 were described as including a fastener retention member that could be removably coupled to a handle member, such as through a corresponding pair of threaded elements. By contrast, the set tool 600 has a head integrally formed with a handle.

The set tool 600 may comprise an elongate body structure 602 extending from a first end (as depicted in FIGS. 6A-6B) and a second end (which may be the same as or substantially similar to a striking end as described above). The elongate body structure 602 may define a fastener retention recess 604 and a channel 610 extending into the elongate body structure 602 and below the fastener retention recess 604. A barrier wall 616 may separate the fastener retention recess 604 from the channel 610.

The fastener retention recess 604 may comprise a number of side walls 606 that define a shape of the fastener retention recess 604. The shape of the side walls 606 is not particularly limited and may be designed in accordance with an intended fastener shape/size/gauge/etc. As discussed above, the side walls 606 may be configured to contact a fastener, when a fastener is placed within the fastener retention recess 604, and may secure the fastener in a setting process. A blind end of the fastener retention recess 604 may be defined by an end of the side walls 606 opposite from an opening of the fastener retention recess 604. The fastener retention recess 604 may have the same or similar shape(s), dimension(s), and/or configurations of any of the fastener retention members described herein.

A permanent magnet 612 may be positioned within the channel 610. In some implementations, the permanent magnet 612 may be insertable through the channel 610, such as during assembly. In some cases, the permanent magnet 612 may be encapsulated by a material, such as a material of the elongate body structure 602, and an adhesive, epoxy, or other material, to help retain the permanent magnet 612 in the channel 610. A barrier wall 616 may separate the channel 610 from the fastener retention recess 604 and may prevent direct contact between the permanent magnet 612 and a fastener positioned within the fastener retention recess 604. In addition, the barrier wall 616 may absorb or otherwise redirect forces applied to an end of the elongate body structure 602 so that the forces, or a portion thereof, are not imparted to the permanent magnet 612, thereby preventing damage to the permanent magnet 612.

The set tool 600 may include one or more ramped surfaces, such as the ramped surface 614, along one or more sides of the channel 610. The ramped surface 614 may be a protrusion that extends from the bottom surface of the channel 610, and may be formed from the same unitary structure and/or material as the set elongate body structure 602. The ramped surface 614 may be configured to produce an interference fit between the elongate body structure 602 and the permanent magnet 612. For example, when the permanent magnet 612 is positioned in the channel 610, the permanent magnet 612 may be tightly captured between the ramped surface 614 and an opposite side of the channel 610, thereby retaining the permanent magnet 612 in the channel. In some cases, the ramped surface 614 solely retains the permanent magnet 612 in the channel 610, while in other examples an adhesive, encapsulating material, latch, door, or other feature or material also or instead retains the permanent magnet 612 in the channel 610.

Though the ramped surface 614 is depicted on a bottom surface of the channel 610, in some implementations the ramped surface 614 may be on one or more side surfaces of the channel 610 instead. In such cases, an air gap may be formed between the top surface of the permanent magnet 612 and the top side of the channel 610, and between the bottom surface of the permanent magnet 612 and the bottom surface of the channel 610. This configuration may result in greater isolation of the permanent magnet 612 from impact forces, as the forces may be routed around the permanent magnet 612 such that impact forces on the set tool 600 do not compress the permanent magnet 612.

Figure 7A:
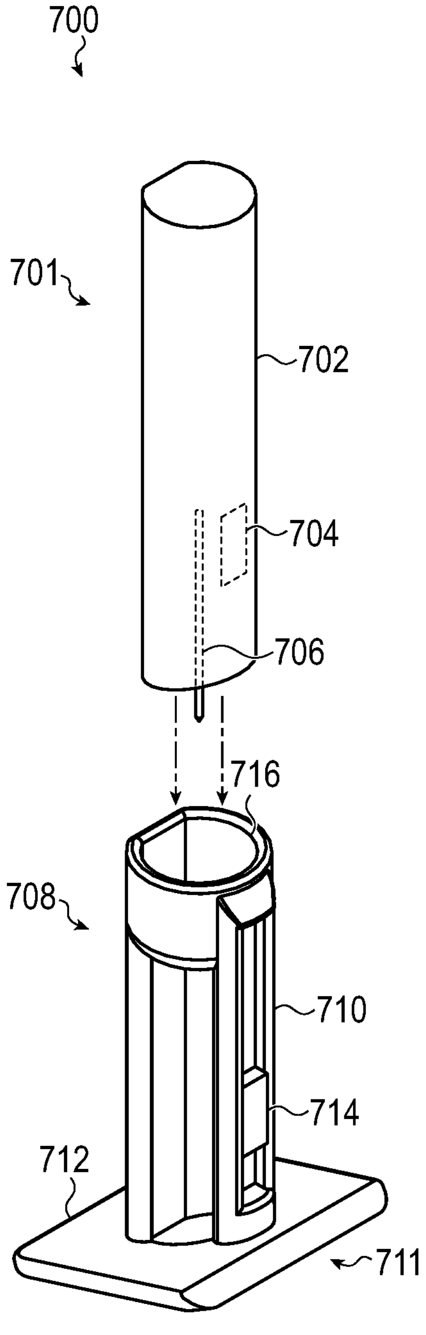
FIGS. 7A-7E illustrate an example tool for driving a fastener into a workpiece, such as described herein.

FIGS. 7A-7E illustrate an example set tool 700 for driving a fastener 706 into a workpiece. As illustrated in FIG. 7A, the set tool 700 may include multiple components including a guide structure 708 and a fastener holder 701 configured to fit and move within the guide structure 708.

The fastener holder 701 may include a handle member 702, such as an elongate shaft. The handle member 702, as depicted in FIG. 7A, may have a substantially circular profile and a flattened portion corresponding to a shape of an associated guide structure 708, though other shapes for the handle member 702 and guide structure 708 are contemplated, in which the handle member 702 is movable within and guided by the guide structure 708.

The fastener holder 701 may include a recess for a fastener 706 to be positioned within. The fastener 706 may be any type of fastener, including the nail illustrated in FIGS. 7A-7C, a staple, a tack, a screw, or the like. A fastener setting and/or driving operation will be discussed with reference to FIGS. 7B-7C.

The fastener holder 701 may additionally include a first magnet 704 encapsulated within or otherwise attached to or integrated with the handle member 702. The first magnet 704 may be configured to retain a fastener 706 in the fastener holder 701, as described herein with respect to other fastener holders (e.g., the fastener retention members 114).

The guide structure 708 may define a guide channel 716 in which the fastener holder 701 may be positioned, and through which the fastener holder 701 may move during loading and fastener setting and driving operations. A shape of the guide channel 716 may correspond to a shape of the handle member 702, as discussed above.

The guide structure 708 may include a second magnet 714 positioned to interact with the first magnet 704 of the fastener holder 701, as described below. In some cases, the second magnet 714 is moveable with respect to the guide structure 708. The second magnet 714 may be positioned in a channel 710 defined by the guide structure 708 and may be moveable within the guide channel 716 (e.g., by a user of the set tool 700). Additionally, the second magnet 714 may interact with the first magnet 704 positioned within the handle member 702 to establish a primed position of the fastener holder 701 and hold the fastener holder 701 in the primed position while the tool 700 is being positioned for setting and/or driving operations. The guide structure 708 may additionally include a flange and, in some implementations, the flange may be adjustable by a user, such that a user can set an angle of the guide structure 708.

In some implementations, the first magnet 704 and the second magnet 714 may magnetically attract to one another. When the first magnet 704 and the second magnet 714 are positioned in proximity to one another, the magnetic attraction may cause the handle member 702 to be retained in a particular position (e.g., a particular height within the guide channel 716) relative to the guide structure 708. The position at which the handle member 702 is maintained by the first and second magnets may be referred to as a primed position. As the phrase is used herein, a primed position may reference a position where the handle member 702 holds the fastener 706 within the handle member 702 (e.g., when the handle member 702 is positioned within the guide structure 708) before the fastener 706 is driven into a workpiece. The first and second magnets may hold the handle member 702 in the primed position during placement and alignment of the tool 700 on a workpiece. When the user imparts a driving force on the handle member 702 (e.g., with a hammer), the attraction force is overcome and the handle member 702 is driven past the primed position so that the fastener is set and/or driven into the workpiece.

In some implementations, various types of shafts may be used with the guide channel 716. For example, a shaft may be configured to hold a staple rather than a nail and may be shaped accordingly (e.g., as discussed above).

To change a location of the primed position, a user may change a position of the second magnet 714 within the guide channel 716. The second magnet 714 may be retained in a user-established position within the guide channel 716 via a friction fit, a latch, or any other suitable mechanism or system.

In alternative implementations, the first magnet 704 and the second magnet 714 may be configured to repel one another to retain the fastener holder 701 in a primed position. In such implementations, when the handle member 702 is positioned so the first magnet 704 is above the second magnet 714, the repulsion force may prevent the handle member 702 from moving downwards (e.g., out of the primed position and towards the workpiece). To overcome the repelling forces, therefore, a user may need to apply a sufficient driving force to force the first magnet 704 past the second magnet 714. The relative positioning between the first magnet 704 and the second magnet 714 is not limited (e.g., with respect to a primed position) and any positioning may be used in accordance with the provided disclosure.

The guide structure 708 may additionally include a workpiece interface structure 712 defining a workpiece interface surface 711. The workpiece interface structure 712 may be angled with respect to a drive path of the fastener holder 701 and may be used to drive the fastener 706 in at an angle with respect to a workpiece (as discussed with reference to FIGS. 7B-7C). In some implementations, the workpiece interface structure 712 may be provided at an oblique angle with respect to a workpiece to provide non-perpendicular fastener orientation. In some implementations, the workpiece interface structure 712 may be provided at a perpendicular angle to provide a perpendicular fastener orientation. A tip of the handle member 702 (e.g., a tip where the fastener 706 is positioned) may similarly be angled at an angle corresponding to an angle of the workpiece interface structure 712, to ensure that the handle member 702 comes into close proximity to the workpiece during a driving operation. In some implementations, the workpiece interface structure 712 is adjustable to different angles and can be locked or otherwise retained in a desired angle.

Figure 7B:
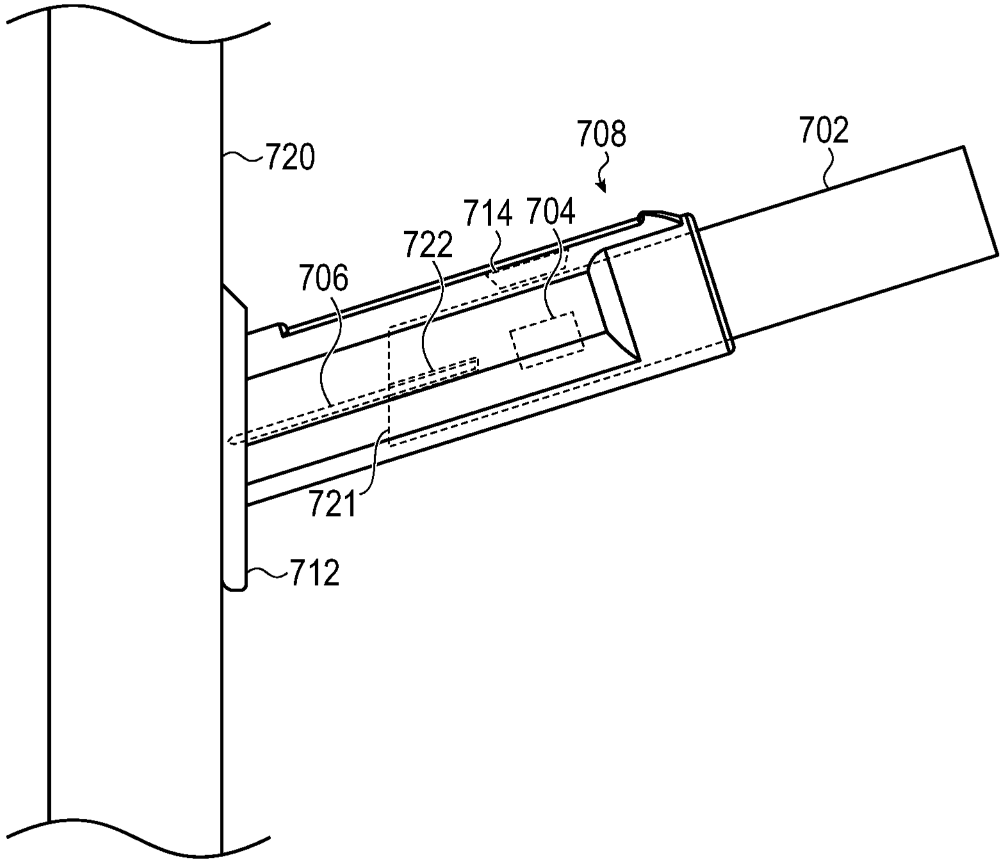
Figure 7C:
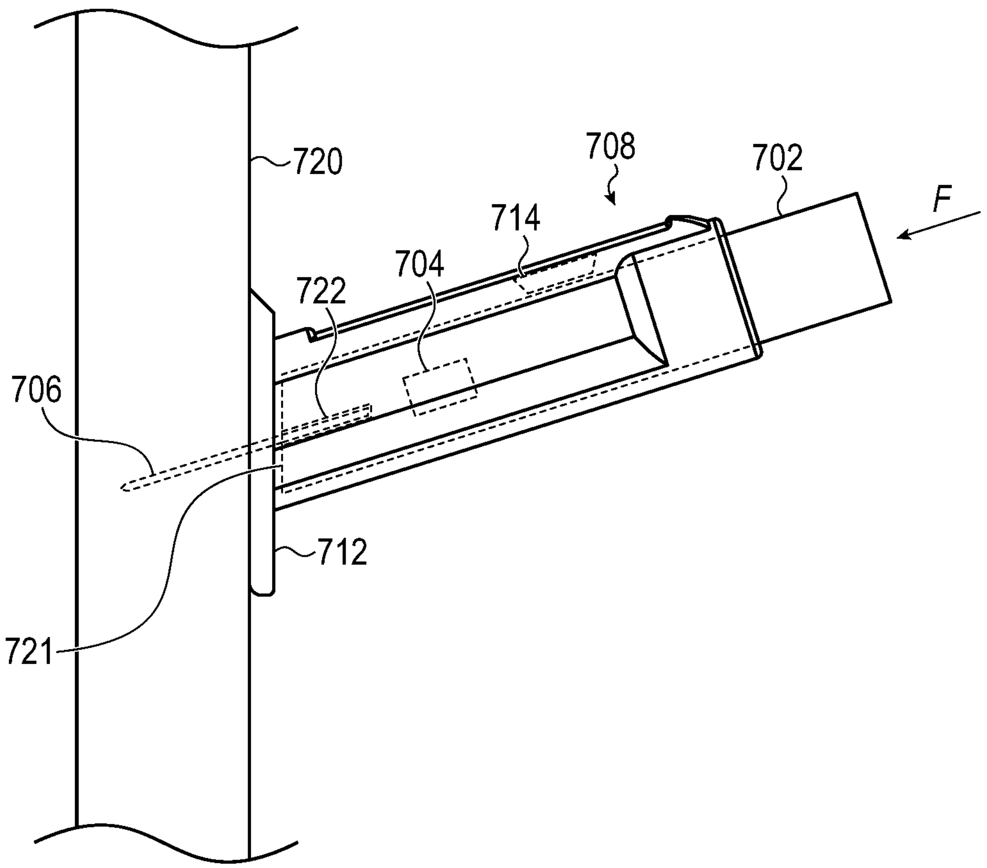

FIGS. 7B-7C illustrate operations of a fastener driving operation. As illustrated in FIG. 7B, and as discussed above, the workpiece interface structure 712 may be positioned against a surface of a workpiece 720 and may serve to reliably establish an angle of the fastener holder 701 (and thus a fastener 706) with respect to the workpiece 720. In the case where the workpiece interface structure 712 is obliquely angled relative to the central axis of the handle member 702, the fastener may be set and/or driven at an angle, which may be useable for, for example, hanging a picture frame or any other operation in which a non-perpendicular fastener angle is desired. The fastener 706 may be positioned within a fastener recess 722 positioned at a first end of a handle member 702. A surface 721 at the first end of the handle member 702 (e.g., the end holding the fastener 706) may be angled at an angle corresponding to an angle of the workpiece interface structure 712.

In FIG. 7B, the handle member 702 is positioned within the guide structure 708 at a primed position. In this implementation, the first magnet 704 positioned within the handle member 702 and the second magnet 714 positioned within the guide structure 708 may be magnetically attracted to one another such that the handle member 702 is magnetically retained in the primed position within the guide structure 708. Of particular note, in the primed position, the fastener 706 may be held entirely within the guide structure 708 and may not yet come into contact with the workpiece 720.

As illustrated in FIG. 7C, a force F may be applied to an end of the handle member 702, thereby initiating a fastener setting or driving operation. The force F may be sufficient to overcome the attraction force between the first magnet 704 and the second magnet 714, and may drive the fastener 706 at least partially into the workpiece 720 at an angle defined by the workpiece interface structure 712. As illustrated in FIG. 7C, the fastener 706 may not be driven fully into the workpiece 720 as the handle member 702 contacts an internal surface of the workpiece interface structure 712 and/or the workpiece 720 and is prevented from moving further. In some cases, the depth of the recess 722 may be configured to leave a certain amount of the fastener exposed and not driven in to the workpiece (such as a length of fastener that is useful for hanging pictures on a wall).

After the fastener 706 is driven into the workpiece 720, the set tool 700 may be removed leaving only the fastener 706 in the workpiece 720. As illustrated, a portion of the fastener 706 may remain outside of the workpiece 720 and may be used to, for example, hang a picture. An angle of the fastener 706 with respect to the workpiece 720 may correspond to the angle of the handle member 702 and/or the workpiece interface structure 712.

Figure 7D:
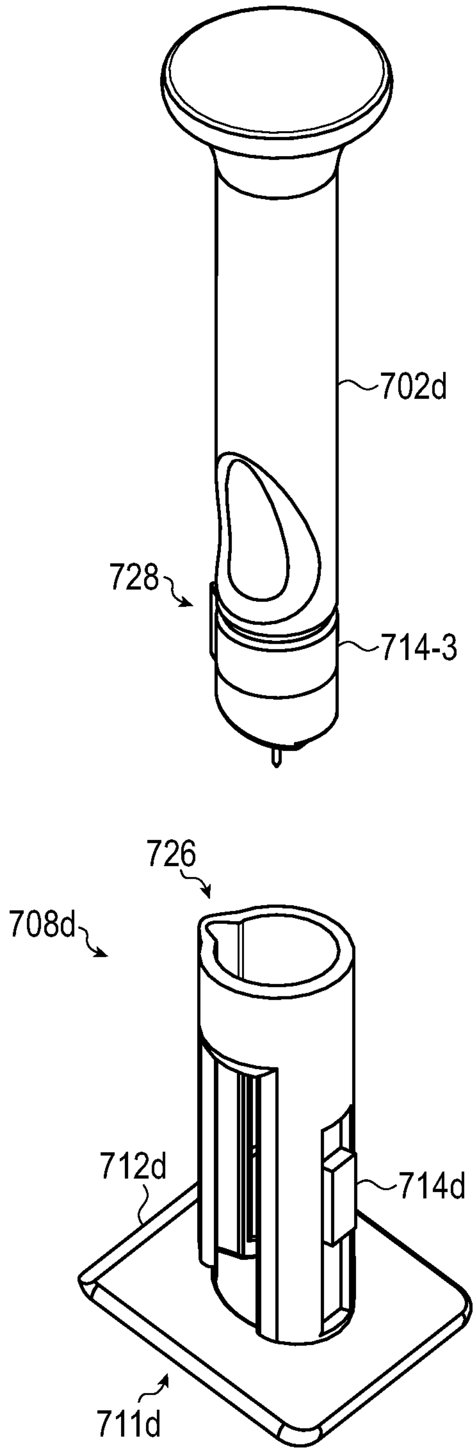
Figure 7E:
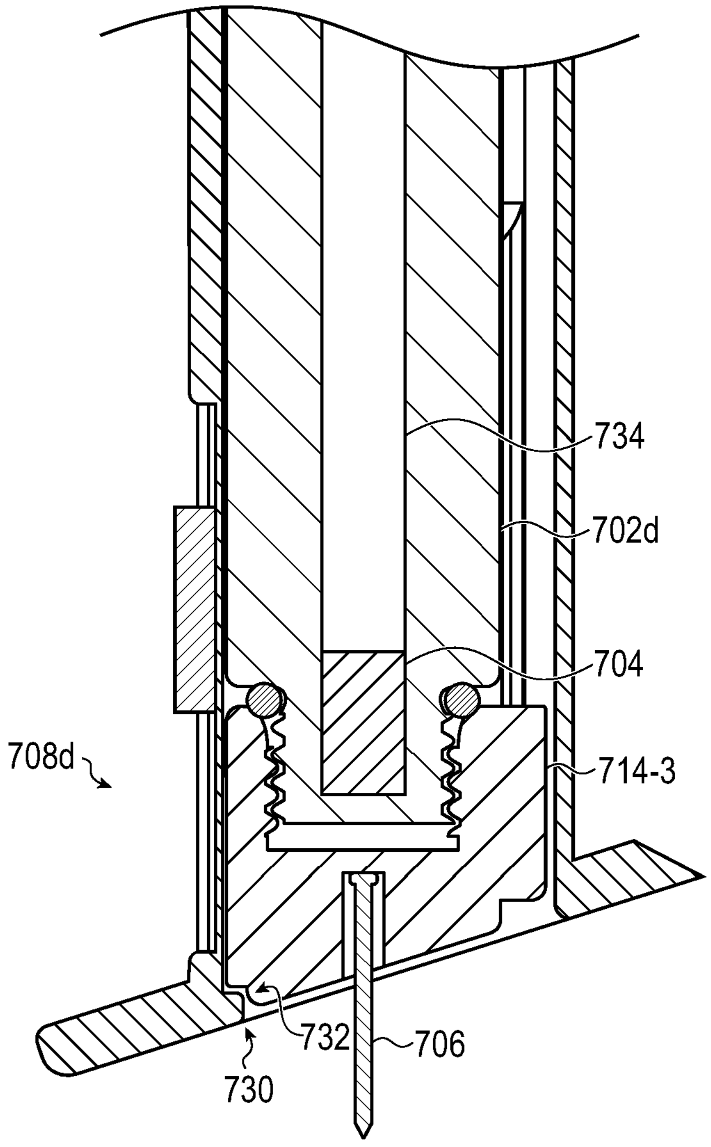

FIGS. 7D-7E illustrate an example of a handle member **702*d* and a fastener retention member 714-3. The handle member 702*d* may, in some implementations, be equivalent to the handle member 102 illustrated in FIGS. 1A-1B. The fastener retention member 714-3 may be similar to the third fastener retention member 114-3, as illustrated in FIG. 1A, but may additionally include a protrusion 728**.

The protrusion 728 may be configured to be received in a channel 726 of a guide structure **708*d*, such that the protrusion 728 is used to align the handle member 702*d* with the guide structure 708*d*. Through this arrangement, a common handle member 702*d* may be used both with and without an associated guide structure, such as discussed herein. Further, different fastener retention members may each have a protrusion 728 so that different fastener retention members can be used with the same handle member 702*d* and guide structure 708*d***.

The guide structure **708*d* may include a channel 726 configured to align the handle member 702*d* through the use of a protrusion 728. The guide structure 708*d* may additionally include a workpiece interface surface 711*d*, a workpiece interface structure 712*d* (e.g., a flange), and permanent magnet 714*d*. The permanent magnet 714*d* may interact with a corresponding magnet positioned within the handle member 702*d*, as discussed with respect to FIGS. 1A-1B**, and may be used to establish a primed position, as described above with respect to FIGS. 7A-7C.

FIG. 7E illustrates a cross-sectional view of a guide structure **708*d* and a handle member 702*d* and fastener retention member 714-3 positioned within the guide structure 708*d* (e.g., as in a driving operation). The guide structure 708*d* may engage or otherwise contact the fastener retention member (e.g., it may contact the fastener retention member in a notch 732) to prevent the fastener retention member 714-3 from extending past an opening of the guide structure during driving. For example, a corresponding lip 730 of the guide structure 708*d* may contact the notch 732 when the handle member 702*d* is fully driven. At this point, the end face of the fastener retention member is recessed relative to the workpiece interface surface 711*d*, such that the fastener retention member does not extend past the workpiece interface surface 711*d* and does not contact the workpiece. Accordingly, the workpiece is not marred or damaged by an impact from the fastener retention member as a result of a driving operation. As discussed above, the fastener retention member 714-3 may additionally include an angled surface that corresponds to an angle of the workpiece interface structure 712*d*. Through the driving operation, and based on the angle of the workpiece interface structure 712*d*, a fastener 706** may be partially driven into a workpiece at a particular angle.

The handle member may include a cavity 734 through which a permanent magnet 704 is positioned. The permanent magnet 704 may be introduced into the cavity 734 and positioned at the end of the blind cavity 734 and may, in some implementations, be in an interference fit with walls defining the cavity. The cavity 734 may include a ramped and/or tapered configuration to provide the interference fit between the cavity 734 and the magnet 704 in some implementations. A material, such as an epoxy or injected plastic, may be injected or flowed into the cavity 734 and may be allowed to harden, thereby securing the permanent magnet 704. In some implementations, no additional material is introduced into the cavity 734, and the permanent magnet 704 may be secured through mechanical means (e.g., an interference fit).

Figure 8A:
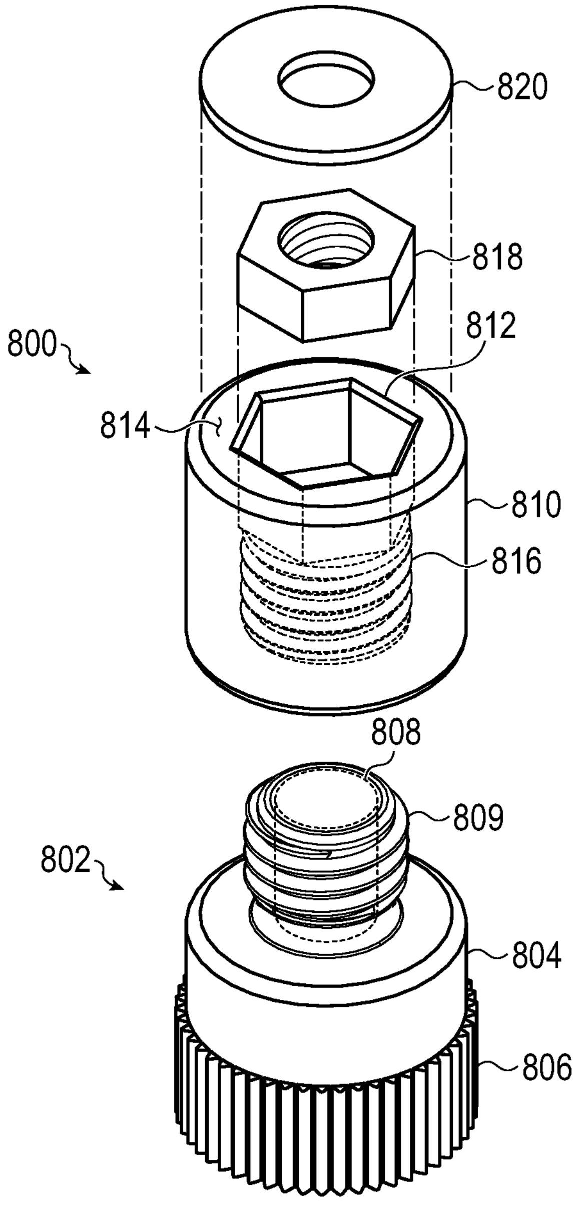
FIGS. 8A-8B illustrate an example tool for setting and installing hardware components, such as a washer and a nut, on an object, such as described herein.
Figure 8B:
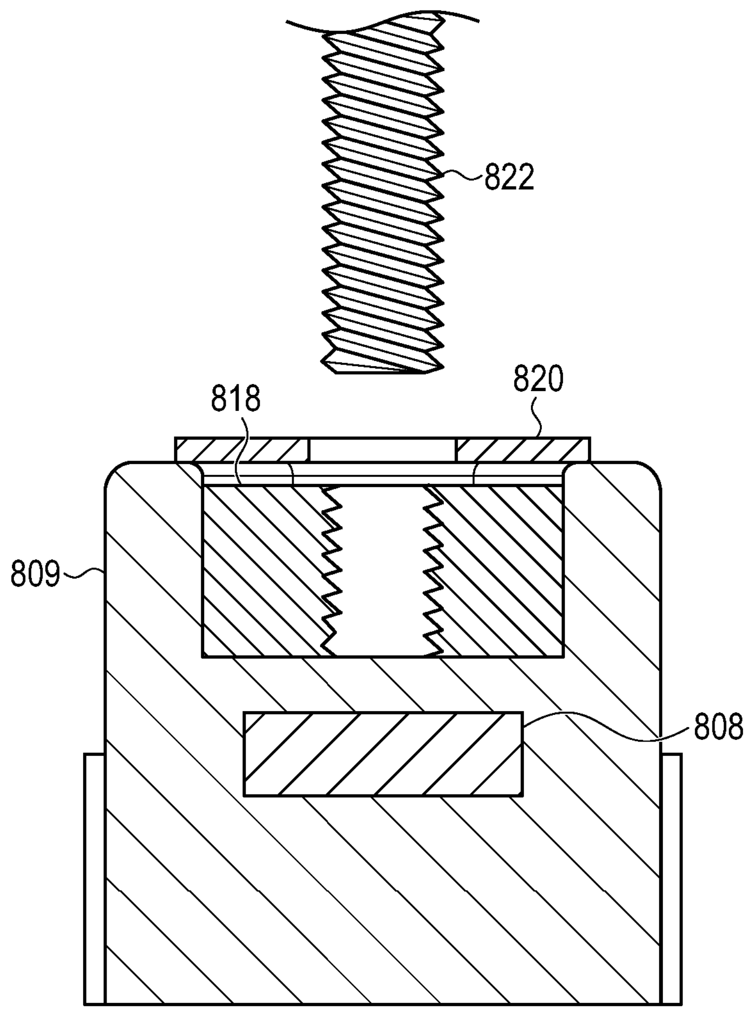

FIGS. 8A-8B illustrate an example tool 800 for setting and installing hardware components, such as a nut 818 and a washer 820. The tool 800 is used to install the nut 818 and the washer 820 on a threaded shaft, including in situations where the nut and/or washer are to be installed upside down, or in a tight location with limited visibility, or in otherwise difficult to see and/or access locations or environments.

The tool 800 includes a handle member 802 and a fastener retention member 810. The handle member 802 may have a shortened length when compared to the handle members discussed with respect to FIGS. 1A-7C, as the handle member 802 may be configured to be held or pinched by the tips of two or three fingers. The handle member 802 may include a knurled, slotted, or otherwise textured portion 806 which may assist a user when gripping and rotating the tool 800. The handle member 802 may optionally include a smooth portion 804 adjacent to the knurled portion 806.

The handle member 802 may further include a coupling protrusion 809 and a permanent magnet 808 positioned within the coupling protrusion 809. The installation of the permanent magnet 808 with respect to the coupling protrusion 809 may be substantially similar as described above. The coupling protrusion 809 may be a threaded protrusion and may be configured to engage with a coupling recess 816 of the fastener retention member 810. The coupling recess 816 may be a threaded recess corresponding to the threads of the threaded protrusion.

The fastener retention member 810 may have a top surface 814 and a fastener retention recess 812. The fastener retention recess 812 may have a shape corresponding to a shape of a nut 818. In the example depicted in FIGS. 8A-8B, the fastener retention recess 812 has a hexagonal shape, though other shapes may be used in accordance with the provided disclosure. When the fastener retention member 810 is engaged with the handle member 802, the permanent magnet 808 may secure the nut 818 and/or washer 820 within the fastener retention recess 812 and on the top surface 814, respectively.

With reference to FIG. 8B, the nut 818 may be positioned within the fastener retention recess 812 and a washer 820 may be positioned on the top surface 814 of the fastener retention member 810. The permanent magnet 808 may attract the washer 820 and the nut 818 and may magnetically retain the washer 820 on the top surface 814 and the nut 818 within the fastener retention recess 812. Therefore, the nut 818 and washer 820 may be secured to the tool 800 while the tool is moved into position relative to a bolt or other threaded object (even if the tool 800 is held upside down or horizontally to the ground). Through this arrangement, the nut 818 and washer 820 may be installed on an object 822 (e.g., a screw) even if the object 822 is awkwardly positioned.

In some implementations, the permanent magnet 808 and tool design may maintain axial alignment of the nut 818 and washer 820, so that a single operation results in both being accurately aligned to the object 822. Further, multiple handle members may be provided for different nut and/or washer sizes and/or shapes (e.g., non-hexagonal shapes). In some implementations, the top surface 814 may have a surrounding flange to assist in aligning a washer. Further, the top surface may, in some cases, be concave to assist in axially aligning the washers.

Accordingly, one may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but are instead defined by the claims herein presented.

What is claimed is:

1. A tool for driving a fastener into a workpiece, the tool comprising:

a fastener retention member defining:

a fastener retention recess at a first end of the fastener retention member and configured to receive at least a portion of the fastener positioned therein; and a coupling recess at a second end of the fastener retention member, the coupling recess defining a bottom surface;

a handle member defining a coupling protrusion at a coupling end of the handle member, the coupling protrusion configured to engage with the coupling recess of the fastener retention member to removably couple the handle member to the fastener retention member, the handle member comprising a permanent magnet at least partially within the coupling protrusion and configured to magnetically retain the fastener within the fastener retention member; and a flexible seal positioned between the fastener retention member and the handle member and inhibiting direct contact between a first surface of the handle member and a second surface of the fastener retention member, wherein:

a gap is defined between an end surface of the coupling protrusion and the bottom surface of the coupling recess when the fastener retention member is coupled to the handle member via the coupling recess and the coupling protrusion;

the permanent magnet is configured to magnetically couple to the fastener across the gap, wherein the gap substantially isolates the permanent magnet from an impact force received at the handle member; and the handle member, the fastener retention member, and the flexible seal define a force path from the handle member to the fastener retention member that transfers the impact force received at the handle member, to the fastener retention member, around the permanent magnet.

2. The tool of claim 1, wherein the fastener retention member further defines:

a cylindrical portion; and a rectangular portion, wherein:

the cylindrical portion extends from the first end of the fastener retention member to a transition region;

the rectangular portion extends from the second end of the fastener retention member to the transition region;

the coupling recess is located at least partially in the cylindrical portion; and the fastener retention recess is located at least partially in the rectangular portion.

3. The tool of claim 1, wherein:

the fastener retention recess further defines:

a first angled wall surface extending from an opening of the fastener retention recess; and a second angled wall surface extending from the opening of the fastener retention recess; and the first angled wall surface and the second angled wall surface define a tapered portion of the fastener retention recess.

4. The tool of claim 3, wherein a first tine of the fastener contacts the first angled wall surface and a second tine of the fastener contacts the second angled wall surface when the at least the portion of the fastener is positioned within the fastener retention recess.

5. The tool of claim 3, wherein a blind end of the fastener retention recess defines a curved surface configured to receive a curved portion of the fastener thereon.

6. The tool of claim 1, wherein:

the coupling protrusion of the handle member is a threaded protrusion;

the coupling recess is a threaded hole; and the threaded protrusion engages with the threaded hole.

7. The tool of claim 1, wherein:

the coupling protrusion defines a hollow portion within the coupling protrusion; and the permanent magnet is positioned within the hollow portion.

8. The tool of claim 1, wherein:

the handle member defines a striking end opposite to the coupling end;

the handle member is configured to receive the impact force at the striking end; and the handle member is configured to transfer the impact force to the fastener retention member to drive the fastener into the workpiece.

9. The tool of claim 1, wherein the fastener retention recess further defines:

a first bowl portion having a first diameter; and a second bowl portion having a second diameter, the second diameter different from the first diameter.

10. A tool for driving a fastener into a workpiece, the tool comprising:

a fastener retention member defining:

a fastener retention recess at a first end of the fastener retention member and configured to receive at least a portion of the fastener positioned therein; and a threaded coupling recess at a second end of the fastener retention member the threaded coupling recess defining a bottom surface;

a handle member defining a threaded coupling protrusion at a coupling end of the handle member, the threaded coupling protrusion configured to engage with the threaded coupling recess of the fastener retention member to removably couple the handle member to the fastener retention member, the handle member comprising a permanent magnet at least partially within the coupling protrusion and configured to magnetically retain the fastener within the fastener retention member; and a polymer sealing member positioned between the fastener retention member and the handle member and configured to define a separation distance between opposing surfaces of the handle member and the fastener retention member, wherein an impact force received by the handle member is transferred to the fastener retention member at least partially through the polymer sealing member, wherein a gap is defined between an end surface of the threaded coupling protrusion and the bottom surface of the threaded coupling recess when the fastener retention member is coupled to the handle member via the threaded coupling member and the threaded coupling recess;

the permanent magnet is configured to magnetically couple to the fastener across the gap, wherein the gap substantially isolates the permanent magnet from an impact force received at the handle member; and the handle member, the fastener retention member, and the polymer sealing member define a force path from the handle member to the fastener retention member that transfers the impact force received at the handle member, to the fastener retention member, around the permanent magnet.

11. The tool of claim 10, wherein the fastener retention member further defines:

a cylindrical portion; and a rectangular portion, wherein:

the cylindrical portion extends from the first end of the fastener retention member to a transition region;

the rectangular portion extends from the second end of the fastener retention member to the transition region;

the threaded coupling recess is located at least partially in the cylindrical portion; and the fastener retention recess is located at least partially in the rectangular portion.

* * * * *